(12) United States Patent
Combs

(10) Patent No.: US 8,556,230 B2
(45) Date of Patent: Oct. 15, 2013

(54) FIRE FIGHTING FLUID DELIVERY DEVICE WITH SENSOR

(75) Inventor: Eric N. Combs, Goshen, IN (US)

(73) Assignee: Elkhart Brass Manufacturing Company, Inc., Elkhart, IN (US)

(*) Notice: Subject to any disclaimer, the term of this patent is extended or adjusted under 35 U.S.C. 154(b) by 0 days.

(21) Appl. No.: 12/896,262

(22) Filed: Oct. 1, 2010

(65) Prior Publication Data
US 2011/0017477 A1  Jan. 27, 2011

Related U.S. Application Data

(63) Continuation of application No. 11/853,278, filed on Sep. 11, 2007, now abandoned.

(60) Provisional application No. 60/844,136, filed on Sep. 13, 2006.

(51) Int. Cl.
*F16K 31/02* (2006.01)
*F16K 31/53* (2006.01)

(52) U.S. Cl.
USPC ............ 251/129.11; 251/248; 251/249.5; 137/554

(58) Field of Classification Search
USPC ........ 137/554; 169/30; 338/162; 251/129.11, 251/248, 249.5
See application file for complete search history.

(56) References Cited

U.S. PATENT DOCUMENTS

| | | | |
|---|---|---|---|
| 2,820,676 A | 1/1958 | Cleaves | |
| 3,776,507 A * | 12/1973 | Tomlin et al. | 251/248 |
| 5,098,063 A | 3/1992 | Ronzon | |
| 6,021,652 A | 2/2000 | Walker | |
| 6,040,756 A | 3/2000 | Kaijala | |
| 6,343,615 B1 | 2/2002 | Miller et al. | |
| 6,460,567 B1 | 10/2002 | Hansen et al. | |
| 6,607,038 B2 | 8/2003 | Ebersole et al. | |
| 6,655,613 B1 | 12/2003 | Brown | |
| 6,733,004 B2 | 5/2004 | Crawley | |
| 6,763,850 B1 | 7/2004 | Jansen et al. | |
| 6,866,512 B2 | 3/2005 | Ebersole, Jr. et al. | |
| 6,886,639 B2 | 5/2005 | Arvidson et al. | |
| 2003/0146522 A1 | 8/2003 | Crawley | |
| 2004/0129909 A1 | 7/2004 | Wiese | |
| 2005/0045345 A1 | 3/2005 | Arvidson et al. | |
| 2008/0060706 A1 * | 3/2008 | Combs | 137/556 |

OTHER PUBLICATIONS

International Search Report for corresponding PCT International Application No. PCT/US07/78262 mailed Jul. 21, 2008.

* cited by examiner

*Primary Examiner* — John Rivell
(74) *Attorney, Agent, or Firm* — Faegre Baker Daniels LLP

(57) ABSTRACT

A firefighting fluid delivery device includes a device body with a fluid passage through which a fluid flows, a fluid flow restrictor member pivotable about a pivot axis to selectively open or close the passage to thereby open or close the device, and an actuator for selectively pivoting the fluid flow restrictor member. The device further includes a sealed rotary sensor that is rotatably coupled to the fluid flow restrictor member for detecting the rotary position of the fluid flow restrictor member to thereby determine the opened or closed state of the device.

33 Claims, 13 Drawing Sheets

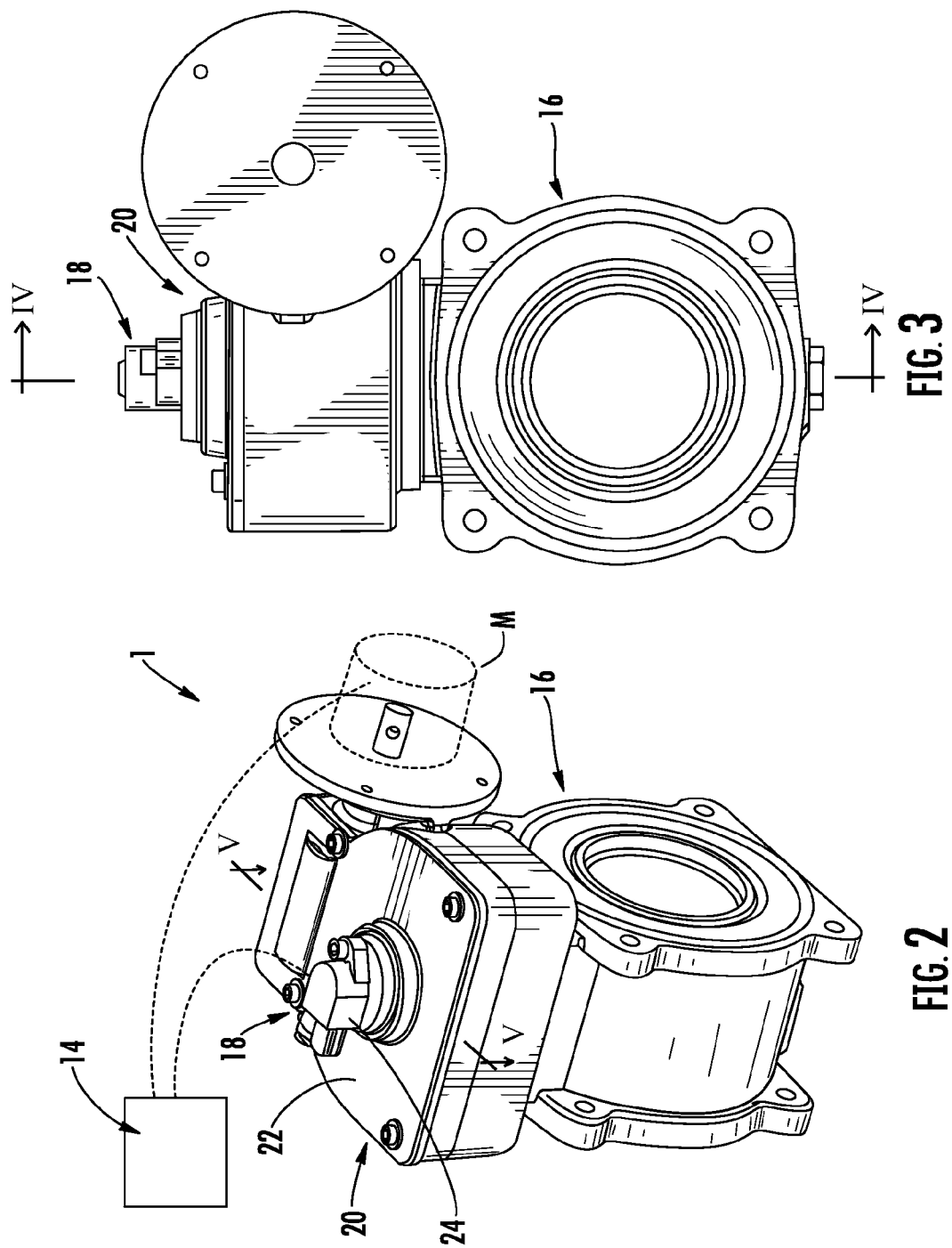

FIRE FIGHTING FLUID DELIVERY DEVICE WITH SENSOR

CROSS-REFERENCE TO RELATED APPLICATIONS

The present application is a continuation of U.S. patent application Ser. No. 11/853,278 for FIRE FIGHTING FLUID DELIVERY DEVICE WITH SENSOR, filed Sep. 11, 2007, which claims the benefit of U.S. provisional application Ser. No. 60/844,136, filed on Sep. 13, 2006, both of which are hereby incorporated herein by reference in their entireties.

BACKGROUND OF THE INVENTION

The present invention generally relates to fire fighting fluid delivery devices, such as valves, monitors, wyes, Siamese devices, or nozzles, and more specifically to an electrically controlled device with a sensor for detecting the flow condition of the device to enhance the control of fluid through the device.

In order to achieve full functionality and operational performance from an electrically controlled fluid delivery device, such as an electrically controlled valve, it is necessary that the valve control system be able to sense the valve flow condition—that is whether the valve is opened or closed. When the flow condition of the valve can be sensed, the integral logic of the valve controller can be used to provide real-time feedback and closed loop control of the fire fighting fluid delivery system. These systems can be any form of truck with or without on-board pumps, building water systems, etc.

Generally, most valves incorporated into the fluid delivery system of a fire fighting apparatus are designed to be used fully open, fully closed, and gated at any position inbetween. By providing direct feedback of valve flow condition, e.g. the position of the ball or gate or other fluid flow restricting member, it is possible to "pre-program" operating activities by directing the valve to open and/or close to a predetermined position, monitoring the valve flow condition, correcting for drift which can be caused by the force of water flowing through a partially open/closed valve, and/or tying the valve flow condition (water flow control) into a closed-loop control system for the apparatus.

While the present invention is described in reference to a valve, the invention is applicable to any product where the control of the fluid restricting member position may be desired, i.e. ball shut-off on a nozzle, ball-shut off on a wye or Siamese device, a ball-shut off or a monitor, a butterfly or gate valve, etc.

Accordingly, there is a need for an electrically powered fluid delivery device whose flow condition can be better monitored and controlled.

SUMMARY OF THE INVENTION

Accordingly, the present invention provides a fire fighting fluid delivery system that provides improved monitoring and, hence, better control over the flow condition of a fluid delivery device.

In one form of the invention, a fire fighting fluid delivery device includes a device body with an inlet and an outlet and a flow restrictor member in the device body that fully or partially opens or closes communication between the inlet and outlet to thereby open or close the device. The device further includes an actuator sub-assembly for moving the flow restrictor member about a pivot axis between its open and closed positions. Suitable actuator sub-assemblies may include pneumatic, hydraulic, electric, or manual (including a push pull or gear driven) actuator sub-assemblies. The actuator sub-assembly includes an actuator or pivot member that is coupled to the flow restrictor member and which is selectively pivoted about the pivot axis by the actuator sub-assembly to thereby pivot the flow restrictor member about its pivot axis to open or close the valve. A sealed rotary sensor having a rotary member whose rotational position generates rotary position signals is coupled to the actuator of the actuator sub-assembly for providing input to a control system for the fluid delivery device so that the sensor provides direct positional feedback of the flow restrictor member to the control system.

According to another form of the invention, a fire fighting fluid delivery system includes a fire fighting fluid delivery device, a rotary sensor, and a control system. The fire fighting fluid delivery device includes a device body with a fluid passage through which a fluid can flow, a fluid flow restrictor member pivotable to selectively open or close the passage to thereby open or close the device, and an actuator for selectively pivoting the fluid flow restrictor member. The rotary sensor is rotatably coupled to the fluid flow restrictor member for detecting the rotary position of the fluid flow restrictor member and is in communication with the control system to provide position feedback of the flow restrictor member to the control system.

In another form of the invention, a firefighting fluid delivery device includes a device body with a fluid passage through which a fluid flows, a flow restrictor member pivotable about a pivot axis to selectively open or close the passage to thereby open or close the device, a rotatable actuator for selectively pivoting the flow restrictor member about its pivot axis, and a rotary sensor. The rotary sensor is directly coupled to the actuator for detecting the rotary position of the flow restrictor member for determining the opened or closed state of the device.

In yet another form of the invention, a firefighting fluid delivery device includes a device body with a fluid passage, a flow restrictor member pivotable to selectively open or close the passage to thereby open or close the device, a rotatable actuator for pivoting the flow restrictor member, and a driver for selectively rotating the actuator. The driver is rotatably coupled to the actuator by a coupler and a rotary sensor is coupled to the coupler for detecting the rotary position of the flow restrictor member to thereby determine the opened or closed state of the device.

According to another form of the invention, a valve control system includes a valve body with an inlet, an outlet, and a fluid passage extending between the inlet and the outlet. A flow restrictor member is located in the passage and is pivotable to selectively open or close communication between the inlet and outlet to thereby open or close the valve. An electrically driven actuator sub-assembly is provided for selectively pivoting the flow restrictor member, which is controlled by a controller. The controller selectively powers the actuator sub-assembly to selectively pivot the flow restrictor member to thereby open or close the device. In addition, a rotary sensor is coupled to the flow restrictor member and is in communication with the controller and, further, is directly coupled to the flow restrictor member to provide direct positional feedback to the controller of the position of the flow restrictor.

In any of the inventions, the fluid delivery devices may comprise a valve, such as a ball valve, a gate valve, or a butterfly valve, a nozzle, a monitor, including a fixed or portable monitor, a wye, or a Siamese device. For example, the nozzle may be mounted to the end of a fire hose, including a fire hose connected to a truck, to a valve on a standpipe, or to a monitor, such as a fixed monitor, including an aerial monitor mounted on an aerial truck, or a portable monitor.

In other aspects, the sensors may comprise variable potentiometers. Further, the sensors may be electrically coupled to the respective control systems or may include a wireless transmitter, such as an RF transmitter, for sending the rotary position signals to the control systems.

In other aspects, the sensors may include at least one wiper that rotates about the pivot axis in response to the flow restrictor member pivoting about its pivot axis. For example, the sensors may include at least two wipers that rotate about the pivot axis in response to the flow restrictor member pivoting about its pivot axis.

In a further aspect, the sensors may comprise sealed sensors.

Accordingly, the present invention provides a simplified assembly for detecting the open or closed state of fluid delivery devices.

These and other objects, advantages, purposes, and features of the invention will become more apparent from the study of the following description taken in conjunction with the drawings.

DETAILED DESCRIPTION OF THE DRAWINGS

FIG. 2 is a perspective view of a fluid delivery device of the present invention with an actuator and a rotary sensor;

FIG. 3 is an elevation view of the fluid delivery device of FIG. 2;

DETAILED DESCRIPTION OF THE PREFERRED EMBODIMENTS

Figure 1:
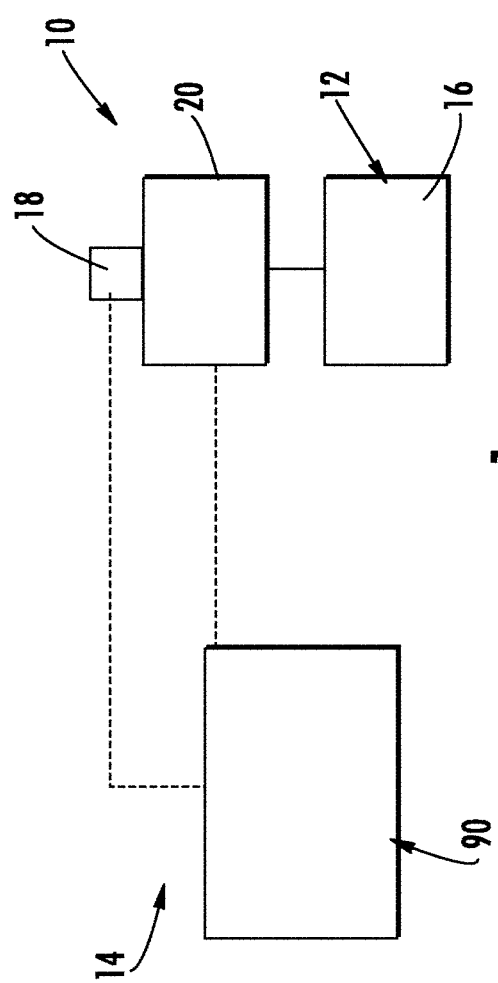
FIG. 1 is a schematic of the fluid delivery device control system of the present invention.
Figure 5:
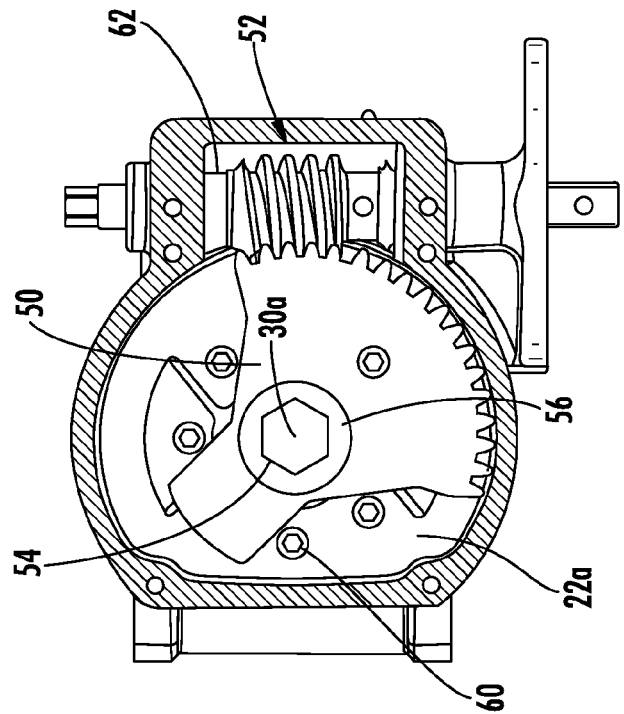
FIG. 5 is a cross-section view taken along line V-V of FIG. 2.

Referring to FIG. 1, the numeral 10 generally designates a fluid delivery system of the present invention. Fluid delivery system 10 is particularly useful in fire fighting applications and includes a fluid delivery device 12 and a control system 14 for controlling the delivery of fluid through device 12. As will be more fully described below, control system 14 is configured with a control feedback loop that provides direct feedback on the open or closed state of the delivery device to enhance the control over the delivery of fluid through the device. This direct feedback may provide several advantages. For example, in prior art devices that rely on indirect readings, such as with encoders or current limiters—there may be false or incorrect readings due to debris or mechanical failures or due to other variables that may come into play. In the present system, the direct feedback avoids the inherent limitations of the indirect systems by reducing variables and components.

Device 12 may comprise a number of different devices, such as a valve, including a ball valve, gate valve, a butterfly valve, for example, a nozzle, a monitor, a wye or a Siamese device, each of which has a fluid passage or passageway extending there through which is opened or partially or fully closed by an articulateable fluid flow restrictor member, such as a ball, gate or disc or the like. As described in more detail below, the rotary position of the fluid flow restrictor member is detected by control system 14, which includes a sensor 18 that provides direct position feedback of the position of the flow restrictor member. For ease of reference, hereinafter reference will be made to a valve 16 and, more particularly, to a ball valve, though it should be understood that the present invention has application in a wide range of devices as noted above.

As noted above, in the illustrated embodiment, device 12 comprises a ball valve 16 and is opened or closed by an electrically driven gear actuation sub-assembly 20. Alternately, valve 16 may be opened or closed by an electrically driven rack and sector actuation sub-assembly using the same concepts described herein. Other suitable actuator sub-assemblies may include pneumatic, hydraulic, or manual (including a push pull or gear driven) actuator sub-assemblies. For further details of other suitable actuation sub-assemblies reference is made herein to U.S. Pat. No. 7,516,941, commonly owned by Elkhart Brass Manufacturing of Elkhart, Ind., which is herein incorporated by reference in its entirety. Further, though illustrated and described in reference to a ball valve, it should be understood that the present invention is not limited to a ball valve and the concepts of the present invention may be used with other types of valves, such as gate valves or butterfly valves or the like. Therefore, the term "fluid delivery device" is used broadly to cover a wide variety of applications.

Referring to FIG. 2, sensor 18 is mounted to actuator sub-assembly 20 and more particularly to housing 22 of actuator sub-assembly. Sensor 18 is an off-the-shelf component and may comprise a variety of rotary sensors, such as the rotary sensors available from CTS Corporation of Elkhart, Ind. Suitable sensors include the 500 series sensors available from CTS. In the illustrated embodiment, sensor 18 comprises a variable potentiometer and is used to sense the rotary position of, for example, a shaft. As will be more fully described, sensor 18 is mounted in a manner to directly sense the rotary position of the fluid flow restrictor member of valve 16 to thereby determine the open or closed state of the valve.

As best seen in FIGS. 2, 4, and 9-10, sensor 18 includes a housing 24 that has a hole 26, which is adapted to accept a rotatable shaft. In housing 24, sensor 18 includes a circuit with resistor and collector tracks. When a shaft is inserted into the housing, the shaft couples to a wiper which passes across the circuit. The position of the wiper in the housing on the surface of the potentiometer's resistor and collector tracks determines a voltage. When the voltage is compared to the total voltage across the resistor, a voltage divider is used to determine the angular position of the wiper. For further details of a suitable sensor, reference is made herein to U.S. Pat. No. 6,040,756, which is owned by CTS Incorporated of Elkhart, Ind. and is incorporated in its entirety herein. It should be understood that other types of rotary sensors may be used, including sensors that incorporate variable resistors. As will be more fully described below, the wiper of the sensor is coupled to the valve so that the sensor can provide direct feed back on the position of the fluid flow restrictor.

Figure 4:
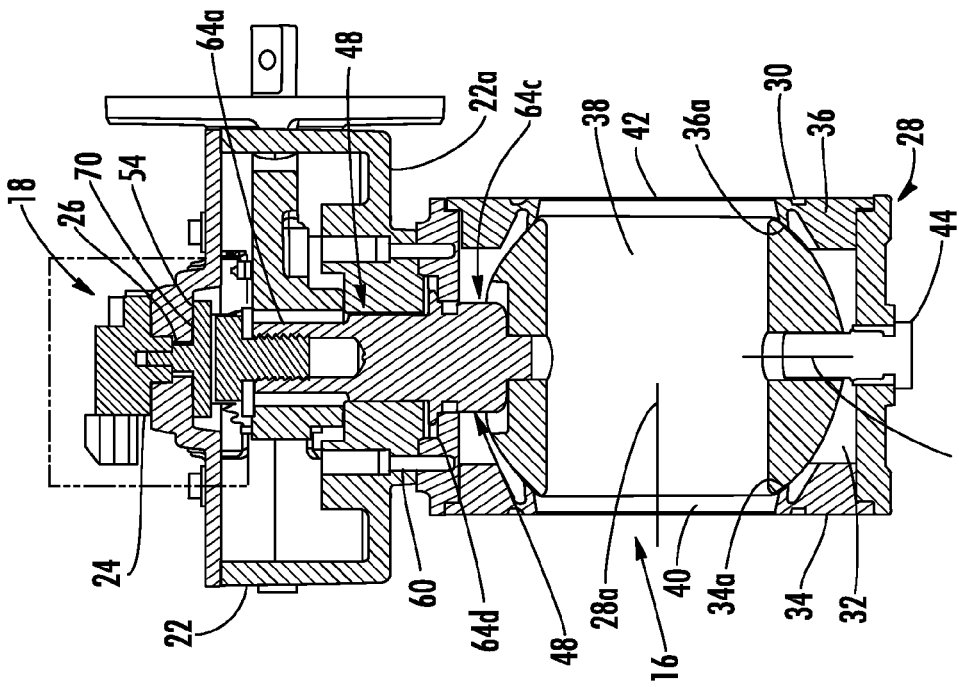
FIG. 4 is a cross-section view taken along line IV-IV of FIG. 3.

Referring to FIG. 4, valve 16 includes a valve body 28 and a valve ball 30, which is located in passageway 32 of valve body 28 and, further, captured therein by a pair of valve seats 34 and 36, which form a pair of opposed valve seat sealing surfaces 34a, 36a for valve body 28. As would be understood by those skilled in the art, valve ball 30 includes a transverse passageway 38, which when aligned along the longitudinal axis 28a of body 28 is in fluid communication with the inlet 40 and outlet 42 formed by valve seats 34 and 36 to thereby open the valve. To gate or close the valve, valve ball 30 is pivoted or swiveled about its vertical pivot axis 30a on a pivot shaft or bolt 44 by actuator sub-assembly 20 to thereby reduce or close the fluid communication between the inlet and outlet of the valve.

Figure 6:
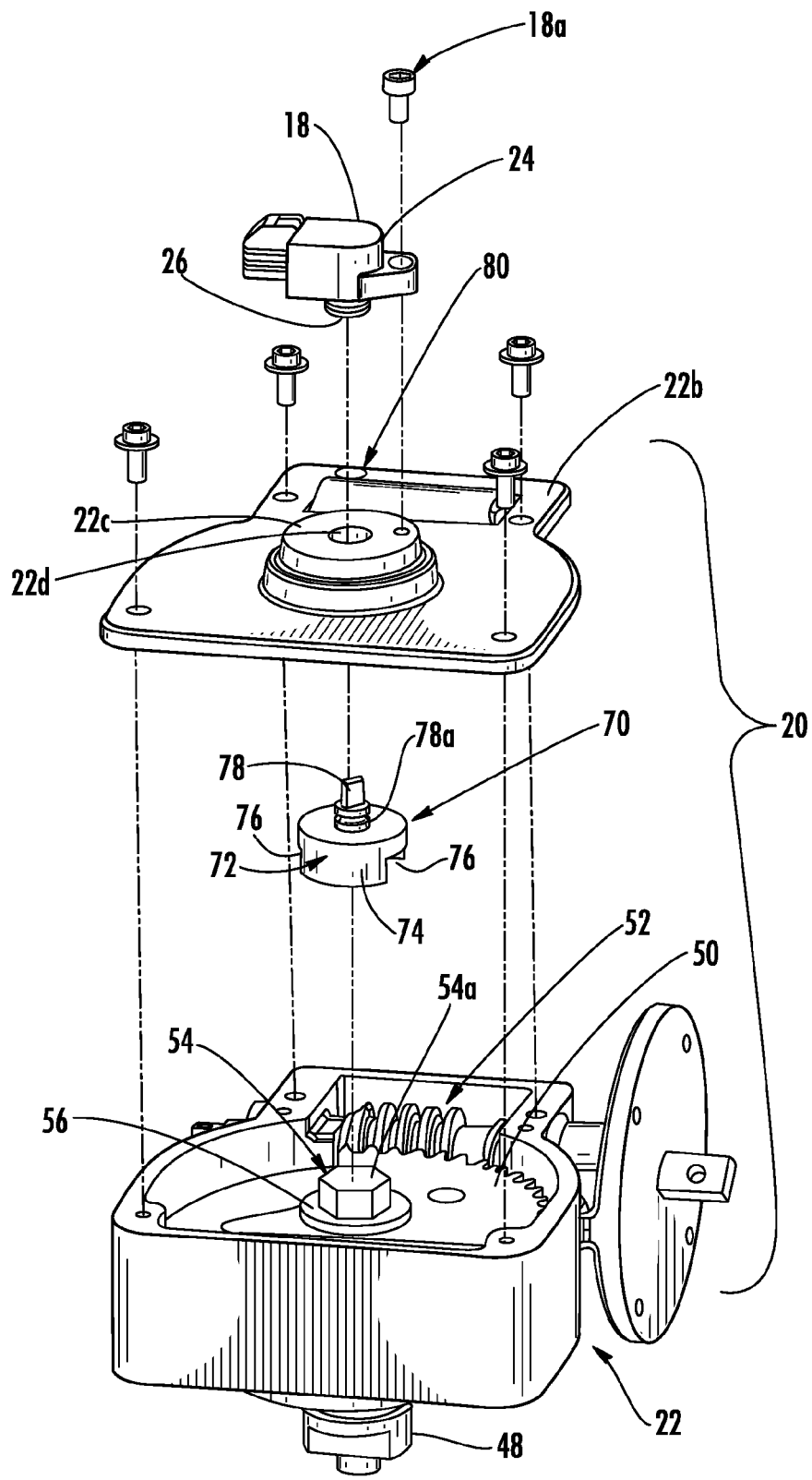
FIG. 6 is an exploded perspective view of the actuator sub-assembly housing and sensor.
Figure 7:
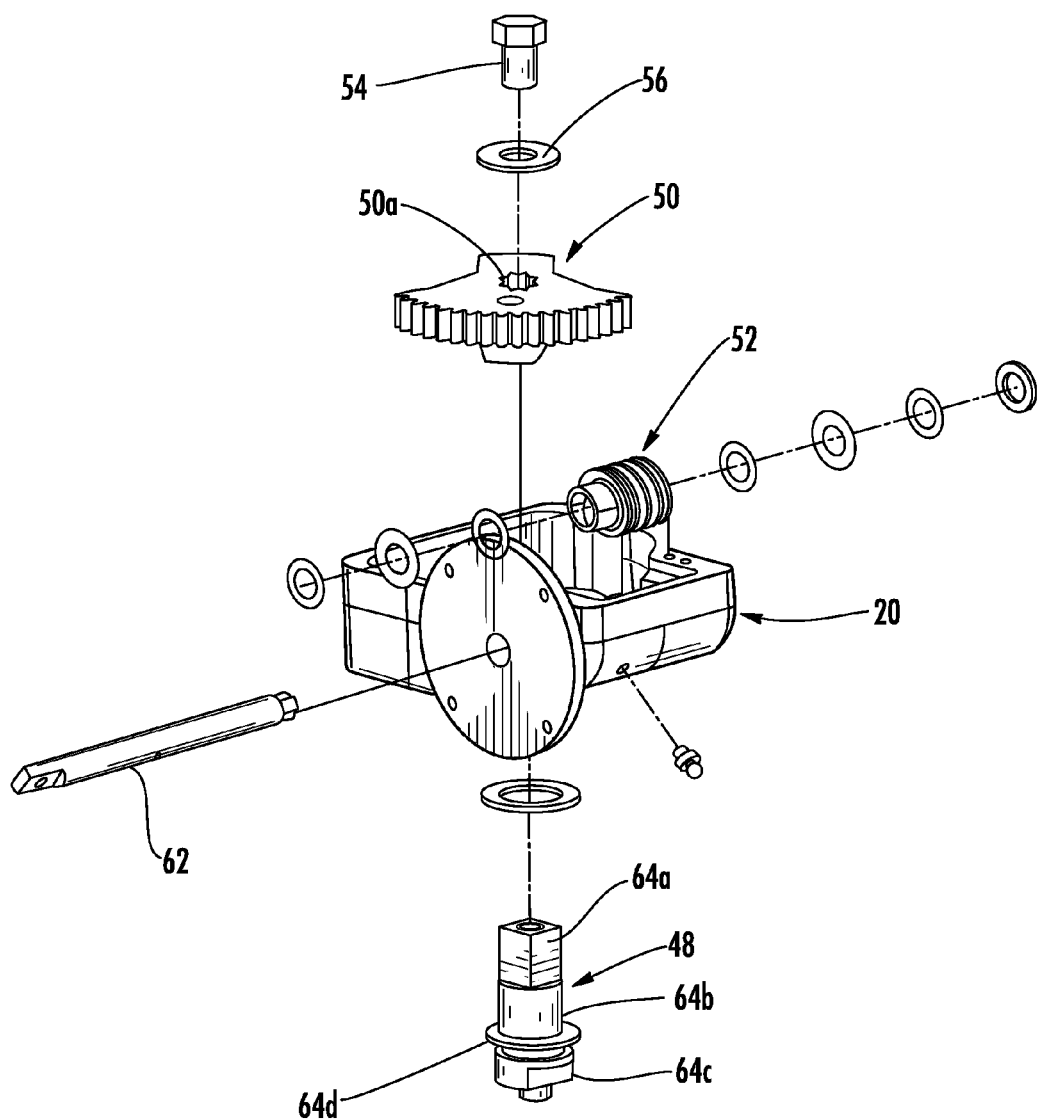
FIG. 7 is an exploded perspective view of the actuator sub-assembly.
Figure 8:
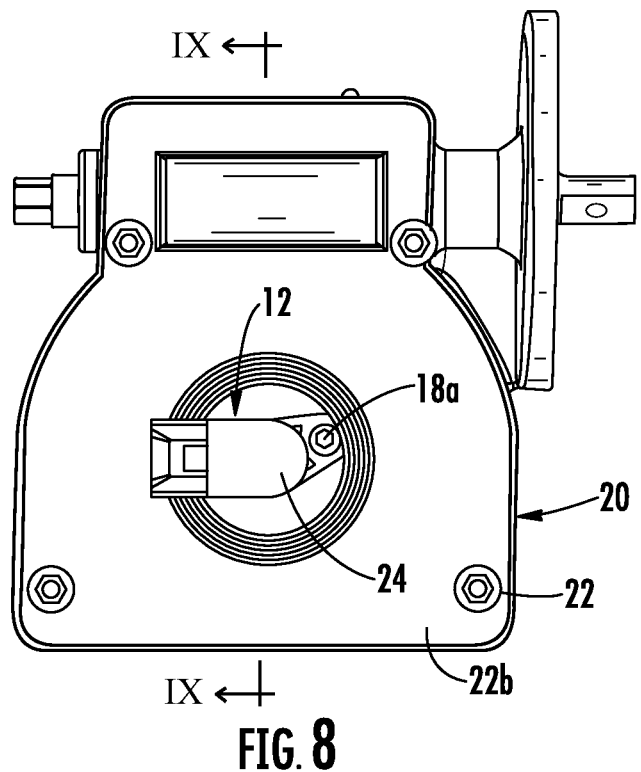
FIG. 8 is top plan view of the actuator sub-assembly and sensor of FIG. 2.
Figure 9:
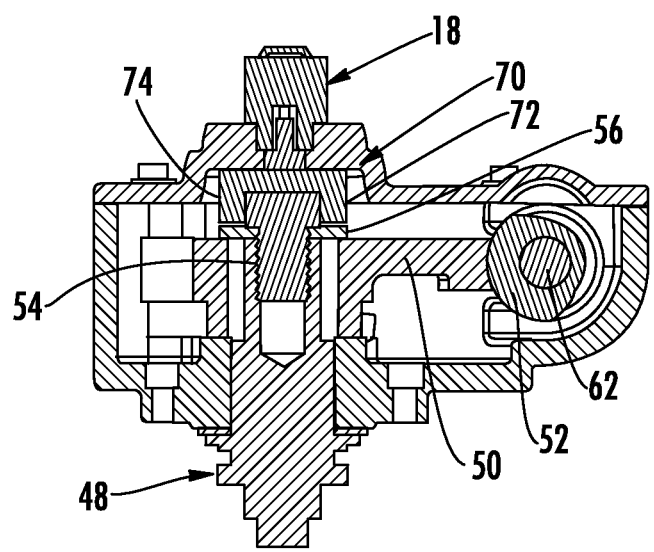
FIG. 9 is a cross-section view taken along line IX-IX of FIG. 8.
Figure 10:
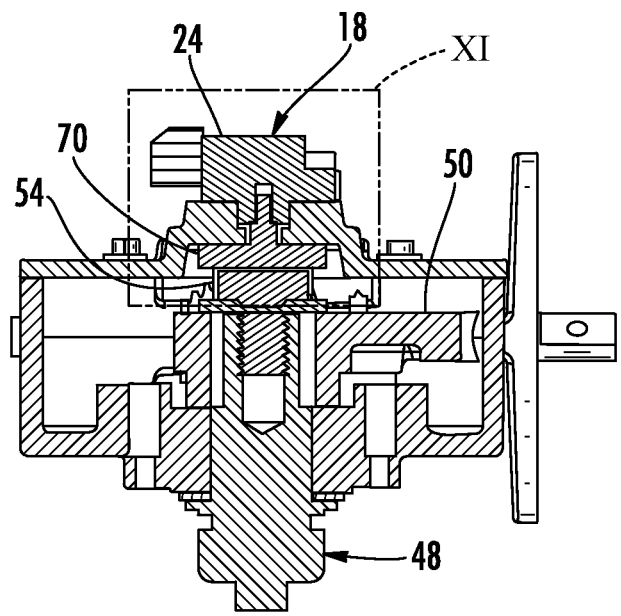
FIG. 10 is a similar cross-section FIG. 4 with the details of the valve body removed.
Figure 11:
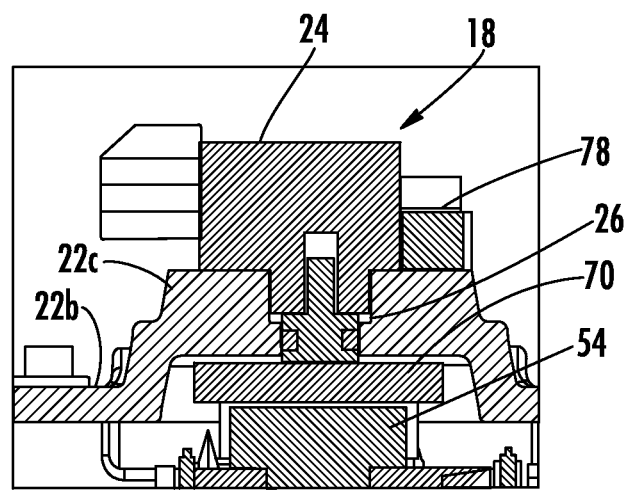
FIG. 11 is an enlarged view of section XI of FIG. 10.
Figure 12:
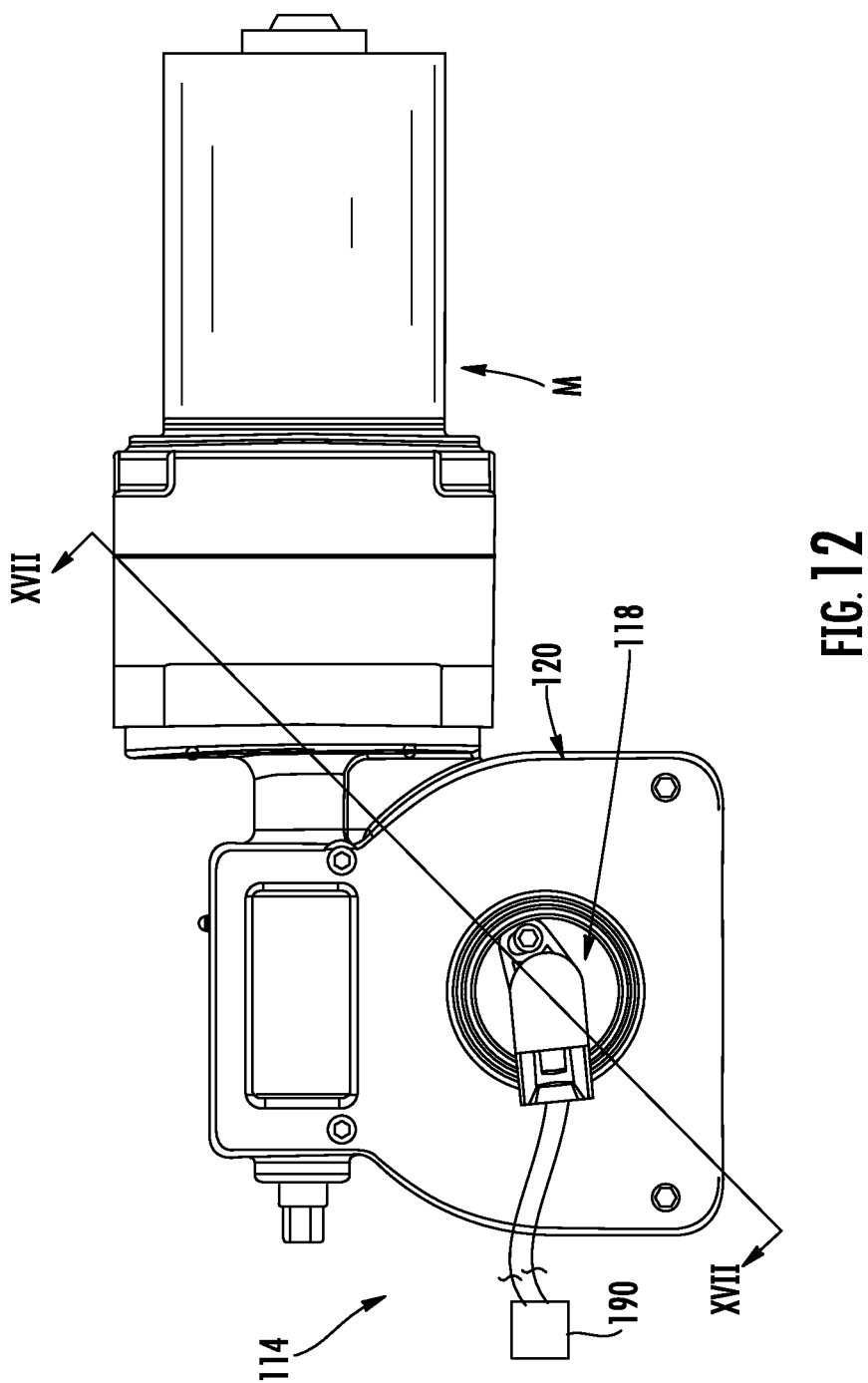
FIG. 12 is a plan view of another embodiment of the actuator sub-assembly and sensor of the present invention with a motor mounted to the flange of the actuator sub-assembly housing.
Figure 13:
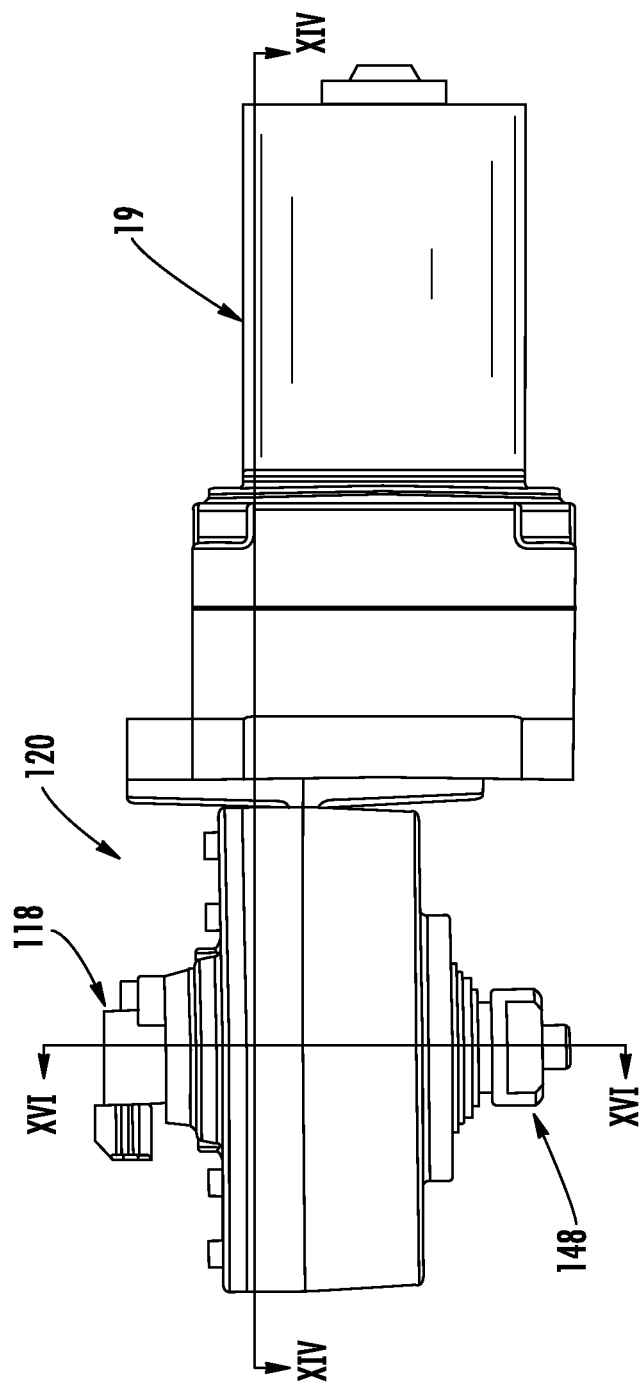
FIG. 13 is an elevation view of the actuator sub-assembly and sensor and motor of FIG. 12.

Referring to FIGS. 4-7, actuation sub-assembly 20 includes an actuator 48 for engaging valve ball 30, a gear sector 50, and a worm gear 52. Gear 52 drives the gear sector 50, which in turn pivots the actuator. As best seen in FIG. 4, actuator 48 extends through housing 22 and valve body 28 for engagement with the engagement surface of the valve ball to pivot the ball valve about pivot bolt 44 to thereby open or close the valve. As best seen in FIG. 7, actuator 48 includes an upper portion 64a, an intermediate portion 64b, and a lower portion 64c. Lower portion 64c engages and pivots valve ball 30. Upper portion 64a of actuator 48 comprises a non-circular cross-section for rotatably coupling to gear sector 50, which in turn meshes with worm gear 52, which is rotatably mounted and supported in housing 22 of actuator sub-assembly 20. Actuator 48 further includes a flange 64d at a lower end of its medial portion 64b, which acts as a stop to limit downward movement of actuator 48 into the valve body and valve ball 30. For further details of actuator 48, reference is made to actuator 64 of the referenced U.S. Pat. No. 7,516,941.

Gear sector 50 is mounted to actuator 48 by a coupler or fastener, such as a bolt 54, that is threaded into upper end 64a of actuator 48 and, further, mounted thereon over a washer 56 to thereby lock gear sector 50 to the actuator. Further, referring to FIG. 7, sector 50 includes a non-circular opening 50a so that sector 50 is rotatably coupled to actuator 48. Thus, rotation of the gear sector 50 about pivot axis 30a induces rotation of actuator 48 and rotation of bolt 54 about pivot axis 30a.

Referring again to FIG. 4, housing 22 of actuator sub-assembly 20 is mounted to valve body 28 by a plurality of fasteners 60 that extend through lower or base wall 22a of housing 22. As noted above, gear sector 50 is mounted to upper end 64a of actuator 48 by bolt 54, and washer 56, so that when sector 50 is rotated about axis 30a, actuator 48 will pivot valve ball 30 to open or close the valve. Worm gear 52 is mounted adjacent gear sector 50 about a shaft 62 that is rotatably supported in housing 22 to rotatably support worm gear 52 in housing 22. Worm gear 52 engages sector 50 so that rotational movement of the shaft 62, which drives worm gear 52, will drive sector 50 and in turn actuator 48. An electric driver, such as a motor M (shown in phantom in FIG. 2) is then coupled to shaft 62. The driver may be mounted externally and, in some cases, remotely from housing 22.

As previously noted, sensor 18 is mounted to housing 22 so that the rotary position of the valve ball can be detected to determine the flow condition of valve 16. As best seen in FIGS. 4, 6, and 9-11, sensor 18 is mounted to cover 22b of housing 22 by a fastener 18a and a snap ring (not shown). Cover 22b includes a raised flange 22c with a central opening 22d that aligns with the opening 26 of sensor housing 24. Sensor 18 is rotatably coupled to actuator 48 by a coupler 70 that engages bolt 54. Because bolt 54 is rotatably mounted to actuator 48, coupling of sensor 18 to bolt 54 will result in sensor 18 being rotatably coupled to the actuator. Further, with this configuration sensor 18 directly senses the rotation of actuator 48 which provides direct positional feedback of the valve ball and, hence, provides direct feedback of the opened or closed state of the valve.

As best seen in FIG. 6, coupler 70 includes an inverted cup-shaped body 72 with a cylindrical wall 74 with slots 76, which accommodate head 54a of bolt 54 and further allows for some variation in perpendicularity of the bolt and bolt head. Extending upwardly from cylindrical shaped body 72 is a shaft 78 that extends through cover 22b and into opening 26 of housing 24 for coupling to the wiper or wipers of sensor 18. Further, shaft 78 is secured in opening 22d of cover 22b by a snap ring coupler 80. Additionally, shaft 78 includes a groove 78a for receiving a seal, such as an O-ring seal for sealing shaft 78 in actuator assembly 20.

As would be understood, the sensor wiper and, hence, sensor 18 is directly coupled to the actuator via bolt 54 and coupler 70 and, therefore, directly senses the rotational position of the ball or fluid flow restrictor member. Further, the control system 14 may be configured in a number of different configurations but preferably includes a controller 90 that is in communication with sensor 18 and further, in the case of an electric actuator sub-assembly, with the motor that drives the actuator. This communication may be hardwired through wires or cables or may be transmitted through the air, for example by way of radio frequency signals, using a transmitter and a receiver. It should be understood that other frequency transmission may also be used.

Referring to FIGS. 12-16, the numeral 114 generally designates another embodiment of a control system of the present invention for a fluid delivery device. Similar to control system 14, control system 114 is configured with a control feedback loop that provides direct feedback on the open or closed-state of the fluid delivery device to enhance control over the delivery of fluid through the device. As noted in the previous embodiment, the device may comprise a number of different devices, such as a valve, including a ball valve, a gate valve, a butterfly valve, for example, as well as a nozzle, a monitor, a wye, or a Siamese device, each of which has a fluid passage or passageway extending therethrough, which is opened or partially closed or fully closed by an articulatable fluid flow restrictor member, such as a ball, gate, or disc or the like.

Similar to system 14, system 114 includes a sensor 116 and an electrically driven gear actuation subassembly 120. Again, similar to sensor 18, sensor 118 may be an off the shelf component and may comprise a variety of rotary sensors, such as the rotary sensors available from CTS Corporation of Elkhart, Ind. Like sensor 18, sensor 118 is mounted in a manner to directly sense rotary position of the fluid flow restrictor member of the fluid delivery device, to which the actuator subassembly is mounted. For further details of sensor 118, reference is made to the first embodiment.

Figure 14:
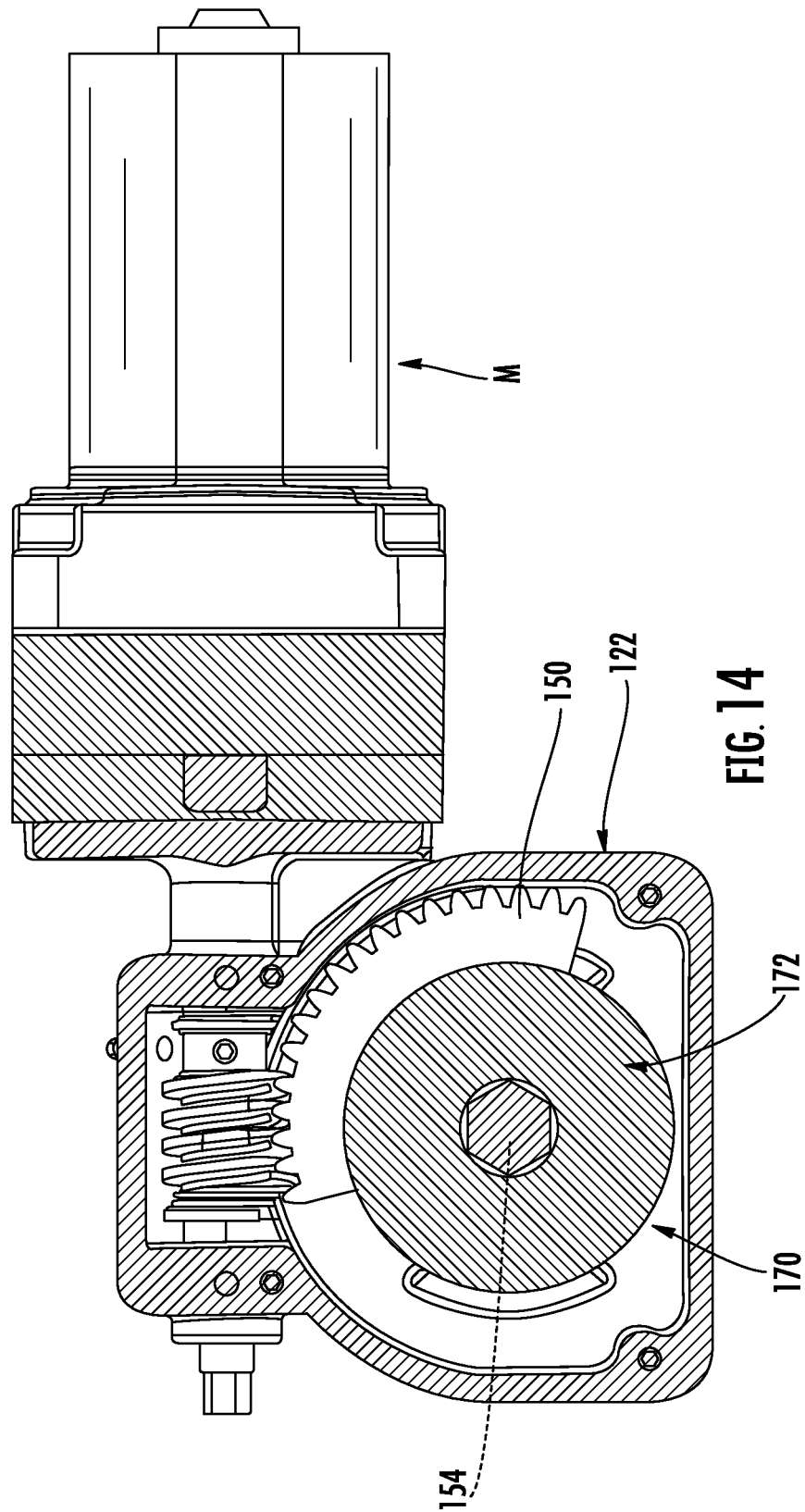
FIG. 14 is a partial cross-section view taken along line XIV-XIV of FIG. 13.
Figure 15:
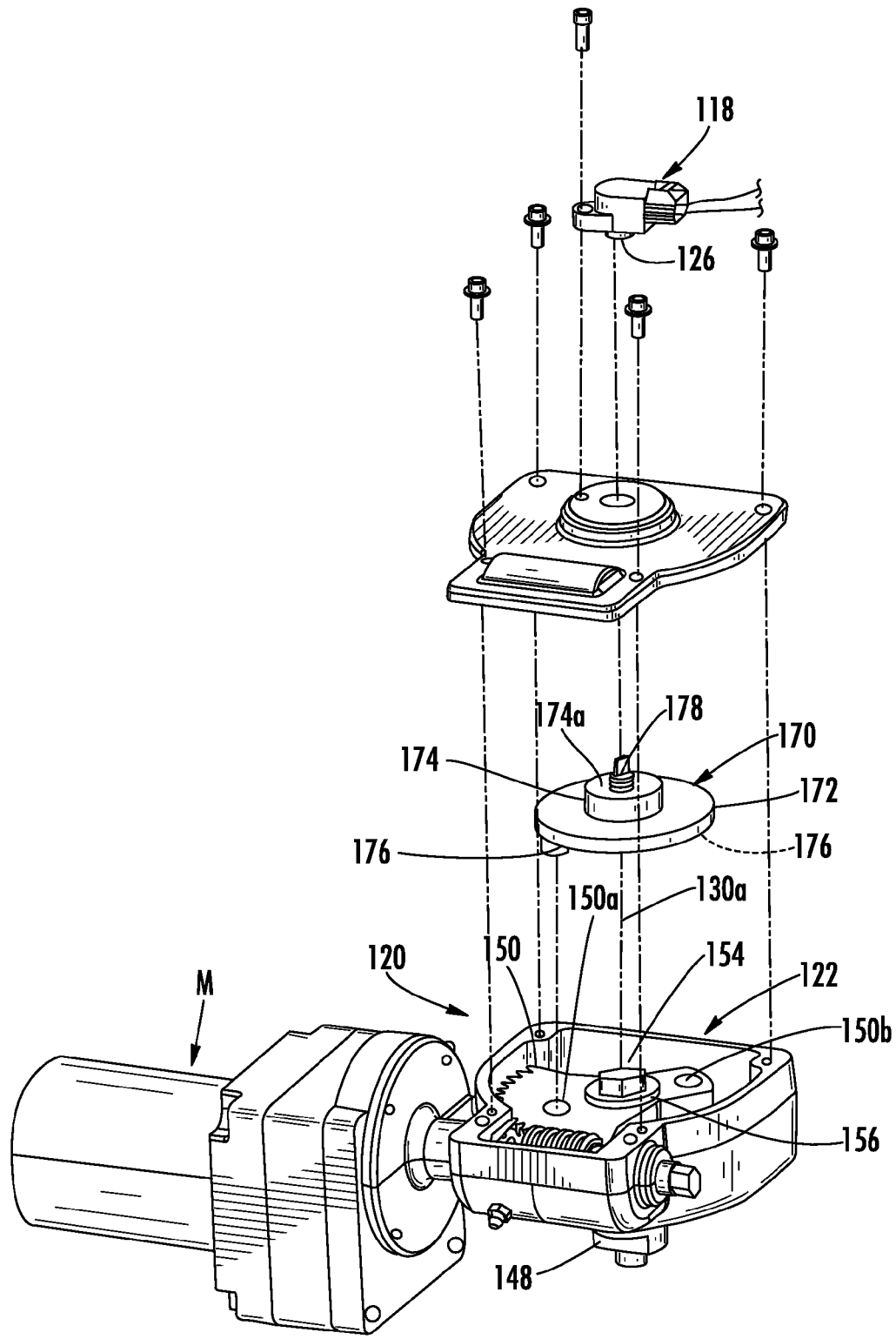
FIG. 15 is an exploded perspective view of the actuator sub-assembly and sensor.
Figure 16:
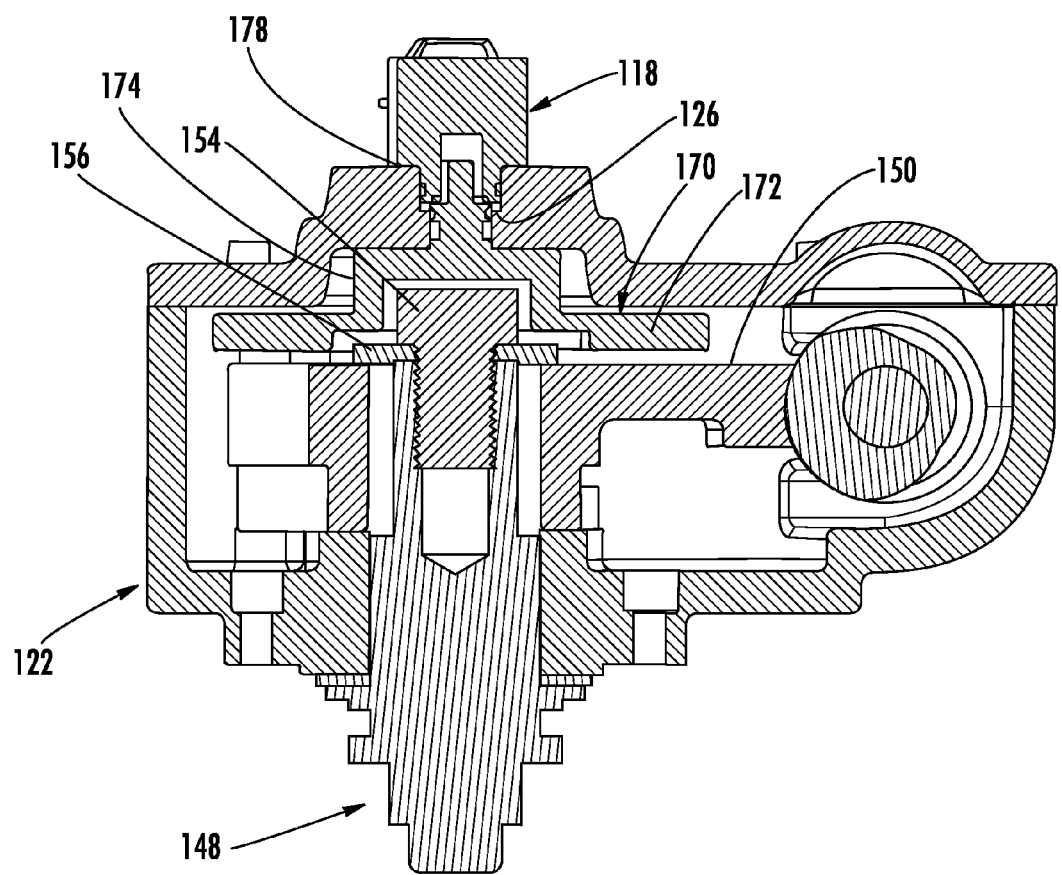
FIG. 16 is a cross-section view taken along line XVI-XVI of FIG. 13.
Figure 17:
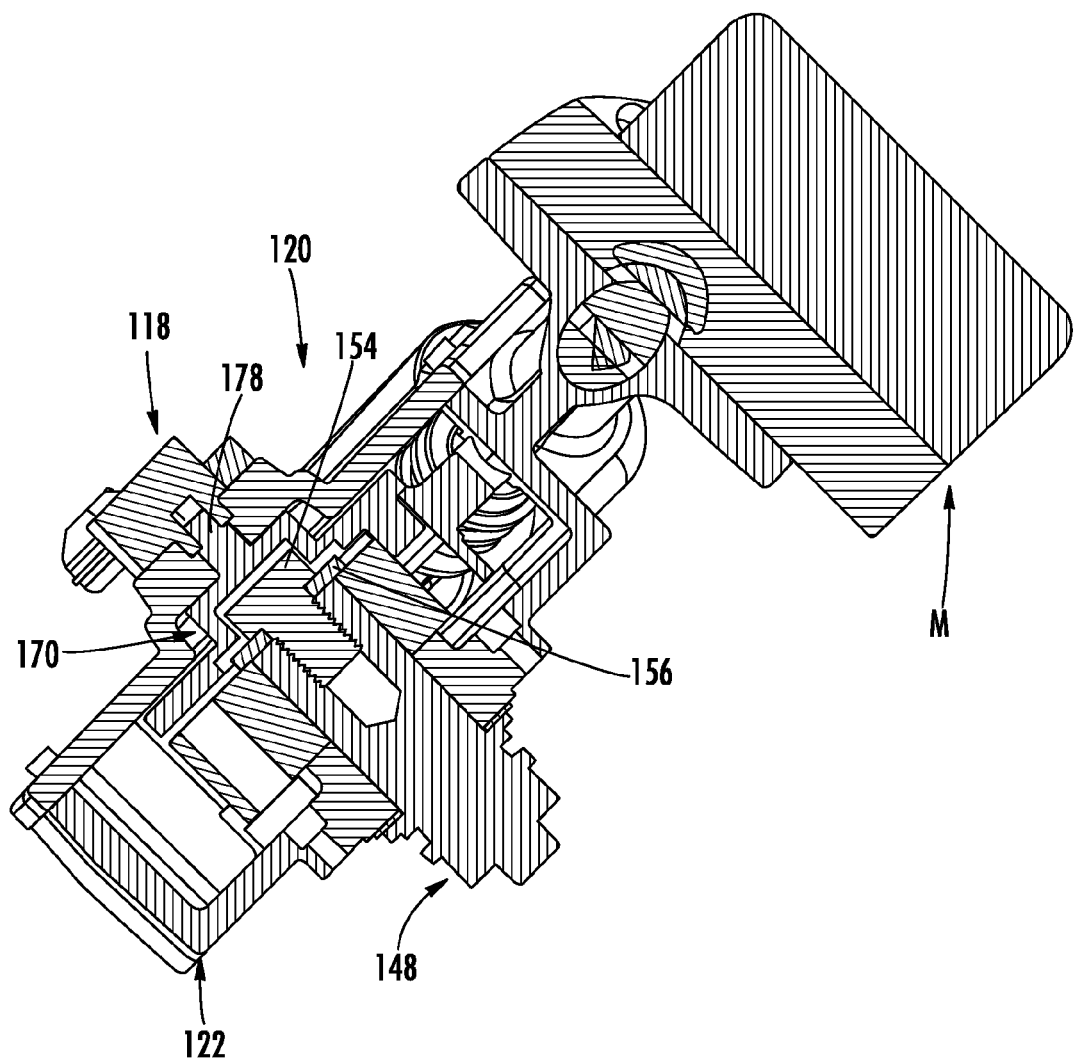
FIG. 17 is a cross-section view taken along line XVII-XVII of FIG. 12.

Referring to FIGS. 14 and 15, actuator sub-assembly 120 includes an actuator sub-assembly housing 122 and a gear 150, such as a gear sector, and an actuator 148, which extends through housing 122 for engagement with the flow restrictor member of the fluid delivery device, which may comprise a valve, as described in reference to the previous embodiment. In the illustrated embodiment, gear 150 is driven by a motor M that is mounted to the gear actuator sub-assembly housing.

Gear 150 is mounted to the upper end of actuator 148 by a bolt 154 and washer 156, similar to the previous embodiment. In this manner, when sector 150 is rotated about axis 130a by motor M, actuator 148 will similarly rotate about axis 130a to pivot the fluid flow restrictor member, such as the valve ball described in reference to the earlier embodiment, to open or close the valve. For further details of the components and operation of actuator sub-assembly 120, reference is made to actuator subassembly 20 of the first embodiment.

As noted above, sensor 118 is mounted to housing 122 such that its opening 126 aligns with a rotatable shaft 178 of a coupler 170, which in turn is mounted to gear 150 and bolt 154. In the illustrated embodiment, coupler 170 includes an annular plate member 172 with a generally centrally located cylindrical cup-shaped member 174 that projects outwardly from annular plate 172. Shaft 178 projects upwardly (as viewed from FIG. 15) from the upper wall 174a of cylindrical cup-shaped member 174 so that when coupler 170 is mounted to gear 150, shaft 178 projects upwardly for engagement with sensor 118 in a similar manner to shaft 78 of coupler 70 described in reference to the previous embodiment. In the illustrated embodiment, plate member 172, cylindrical cup-shaped member 174, and shaft 178 are formed as a monolithic component, typically formed from a rigid material, such as metal. Though it should be understood that coupler 170 may be formed from several components that are secured together, such as by welding.

In order to couple coupler 170 to gear 150, plate 172 includes a downwardly depending pin or cylindrical body 176, which inserts into corresponding opening 150a formed or provided in gear 150. Further, cylindrical wall 174 is sized to extend over nut 154 so when pin 176 is inserted into opening 150a of gear 150, coupler 170 receives nut 154 in cylindrical member 174. In this manner, when gear 150 rotates about axis 130a, coupler 170 will rotate in unison with gear 150. Therefore, the rotation of shaft 178 again provides a direct measure of the rotational position of actuator 148 and, therefore, provides a direct measurement of the rotational position of the fluid flow restrictor member of the fluid delivery device. For further details of an exemplary embodiment of the fluid flow delivery device and the fluid flow restrictor member, reference is made to the first embodiment.

As noted above, sensor 118 is mounted to housing 122 of actuator sub-assembly 122 and, more specifically, to the cover of housing 122. In addition to being mounted to the cover by a fastener, sensor 118 is secured to housing by an integral snap-ring that is provided in the cover of housing 122 and engages the collar of the sensor housing that defines opening 126. In this manner, sensor 118 may be simply pushed into the opening in the cover of housing 122 and then further secured by the fastener, which secures sensor 118 from rotating about axis 130a. For further details of how the sensor 118 and the controller 190 are configured and arranged and, further, operate, reference is made to the first embodiment.

Accordingly, the present invention provides a fluid delivery device control system with a feedback sensor that can be used to provide direct feedback on the flow state of a valve or other fluid delivery device. Further, the sensor may be sealed and can be mounted using a simple design, which provides for a greater flexibility of application because the actuator shaft geometry may be designed to fit almost any application or input geometry.

While several forms of the invention have been described, other forms will now be apparent to those skilled in the art. For example, the control system may be used with other types of actuator sub-assemblies and fluid flow delivery devices, as noted. Therefore, it will be understood that the embodiments shown in the drawings and described above are merely for illustrative purposes, and are not intended to limit the scope of the invention which is defined by the claims which follow as interpreted under the principles of patent law including the doctrine of equivalents.

The embodiments of the invention in which I claim privilege are as follows:

1. A firefighting fluid delivery device comprising:
    a controller;
    a firefighting fluid delivery device body with a fluid passage through which a fluid flows;
    a fluid flow restrictor member pivotable about a pivot axis to selectively open or close said passage to thereby open or close the device;
    an actuator in communication with said controller, said actuator having an actuator housing mounted to said device body, a gear sector and a stem engaging and selectively pivoting said fluid flow restrictor member about said pivot axis between closed and open positions, said stem comprising a fluid flow restrictor member actuator including a non-circular portion and a securing member configured to secure said fluid flow restrictor member actuator with said gear sector, said securing member enclosed by said housing;
    a sensor assembly having a sensor housing and a sealed rotary sensor mounted in said sensor housing and coupled to a rotary member, said sensor in communication with said controller and said sensor housing coupled to said actuator housing;
    a coupler, said coupler including an upwardly extending portion defining a first bearing surface and a downwardly extending portion defining a second bearing surface, said upwardly extending portion extending through said actuator housing and into said sensor housing to thereby engage said rotary member, and said downwardly extending portion engaging said stem, said coupler and said rotary member being aligned along said pivot axis and pivotable with said fluid flow restrictor member, wherein said coupler mechanically links said rotary member of said sensor to said stem so that said sensor directly senses, via said coupler and said rotary member, the rotary position of said fluid flow restrictor member, said sensor generating position signals based on the position of the flow restrictor, and said controller determining the position of the flow restrictor, including its open and closed positions and any position between its open and closed positions, to determine the flow state of the device when fluid is flowing through the device and selectively powering said actuator based on said position sensor signals from said sensor.

2. The device according to claim 1, wherein said fluid delivery device comprises a valve.

3. The device according to claim 2, wherein said valve comprises a ball valve.

4. The device according to claim 3, wherein said sensor comprises a variable potentiometer.

5. The device according to claim 4, wherein said sensor comprises at least one wiper, said wiper rotating about said pivot axis in response to said fluid flow restrictor member pivoting about said pivot axis.

6. The device according to claim 4, wherein said sensor comprises at least two wipers, said wipers rotating about said pivot axis in response to said fluid flow restrictor member pivoting about said pivot axis.

7. The device according to claim 1, wherein said fluid delivery device comprises a wye, a nozzle, or a monitor.

8. The device according to claim 1, wherein said coupler includes a cup shaped body, said upwardly extending portion comprising an upwardly extending shaft defining said first bearing surface.

9. The device according to claim 1, wherein said actuator comprises an electrically powered driver coupled to said stem.

10. The device according to claim 1, wherein said securing member comprises a head and a threaded shaft extending from said head, wherein said downwardly extending portion comprises a slotted cup-shaped member configured to engage said head allowing for variation in perpendicularity of the head and the threaded shaft.

11. The device according to claim 1, wherein said downwardly extending portion of said coupler comprises a plate member and a pin extending from said plate member, and said gear sector comprises an opening configured to receive said pin when said second bearing surface engages said stem.

12. A firefighting fluid delivery device comprising:
a controller;
a firefighting fluid delivery device body with a fluid passage through which a fluid flows;
a fluid flow restrictor member pivotable about a pivot axis to selectively open or close said passage to thereby open or close the device;
an actuator in communication with said controller, said actuator having an actuator housing mounted to said device body, a gear sector and a stem engaging and selectively pivoting said fluid flow restrictor member about said pivot axis between closed and open positions;
a sensor assembly having a sensor housing and a sealed rotary sensor mounted in said sensor housing and coupled to a rotary member, said sensor in communication with said controller and said sensor housing coupled to said actuator housing; and
a coupler, said coupler including an upwardly portion defining a first bearing surface and a downwardly extending portion defining a second bearing surface, said upwardly extending portion extending through said actuator housing and into said sensor housing to thereby engage said rotary member, and said downwardly extending portion engaging said stem, said downwardly extending portion of said coupler comprising a plate member and a pin extending from said plate member, and said gear sector comprising an opening configured to receive said pin when said second bearing surface engages said stem, said coupler and said rotary member being aligned along said pivot axis and pivotable with said fluid flow restrictor member wherein said coupler mechanically links said rotary member of said sensor to said stem so that said sensor directly senses, via said coupler and said rotary member, the rotary position of said fluid flow restrictor member, said sensor generating position signals based on the position of the flow restrictor, and said controller determining the position of the flow restrictor, including its open and closed positions and any position between its open and closed positions, to determine the flow state of the device when fluid is flowing through the device and selectively powering said actuator based on said position sensor signals from said sensor.

13. The device according to claim 12, wherein said fluid delivery device comprises a valve.

14. The device according to claim 12, wherein said fluid delivery device comprises a wye, a nozzle, or a monitor.

15. The device according to claim 12, wherein said coupler includes a cup shaped body, said upwardly extending portion comprising an upwardly extending shaft defining said first bearing surface.

16. The device according to claim 12, wherein said sensor comprises a variable potentiometer.

17. The device according to claim 12, wherein said actuator comprises an electrically powered driver coupled to said stem.

18. A firefighting fluid deliver device operable by a controller to pivot a fluid flow restrictor member about a pivot axis to selectively at least partially open or close a fluid passage through which a fluid flows, the device comprising:
an actuator in communication with said controller, said actuator having an actuator housing, a gear sector and a stem engaging and selectively pivoting said fluid flow restrictor member about said pivot axis between closed and open positions;
a sensor assembly having a sensor housing and a sealed rotary sensor mounted in said sensor housing and coupled to a rotary member, said sensor in communication with said controller and said sensor housing coupled to said actuator housing; and
a coupler, said coupler including an upwardly extending portion defining a first bearing surface and a downwardly extending portion defining a second bearing surface, said coupler further including a cup shaped body, said upwardly extending portion comprising an upwardly extending shaft defining said first bearing surface and including a groove for receiving a seal and sealing said shaft with said housing, said upwardly extending portion engaging said rotary member, and said downwardly extending portion engaging said stem, said coupler and said rotary member pivotable with said fluid flow restrictor member, wherein said coupler links said rotary member of said sensor to said stem so that said sensor directly senses, via said coupler and said rotary member, the rotary position of said fluid flow restrictor member, said sensor generating position signals based on the position of the flow restrictor, the position signals adapted to enable said controller to determine the position of the flow restrictor, including its open and closed positions and any position between its open and closed positions.

19. The device according to claim 18, wherein said sensor comprises a variable potentiometer.

20. The device according to claim 19, wherein said sensor comprises at least one wiper, said wiper rotating about said pivot axis in response to said fluid flow restrictor member pivoting about said pivot axis.

21. The device according to claim 19, wherein said sensor comprises at least two wipers, said wipers rotating about said pivot axis in response to said fluid flow restrictor member pivoting about said pivot axis.

22. The device according to claim 18, wherein said fluid delivery device comprises a valve.

23. The device according to claim 18, wherein said fluid delivery device comprises a wye, a nozzle, or a monitor.

24. The device according to claim 18, wherein said stem comprises a fluid flow restrictor member actuator including a non-circular portion and a securing member configured to secure said fluid flow restrictor member actuator with said gear sector, said securing member enclosed by said housing.

25. The device according to claim 18, wherein said sensor comprises a variable potentiometer.

26. The device according to claim 18, wherein said actuator comprises an electrically powered driver coupled to said stem.

27. A firefighting fluid delivery device operable by a controller to pivot a fluid flow restrictor member about a pivot axis to selectively at least partially open or close a fluid passage through which a fluid flows, the device comprising:
an actuator in communication with said controller, said actuator having an actuator housing, a gear sector and a stem engaging and selectively pivoting said fluid flow restrictor member about said pivot axis between closed and open positions, said stem comprising a fluid flow restrictor member actuator including a non-circular portion and a securing member configured to secure said fluid flow restrictor member actuator with said gear sector, said securing member enclosed by said housing;
a sensor assembly having a sensor housing and a sealed rotary sensor mounted in said sensor housing and coupled to a rotary member, said sensor in communication with said controller and said sensor housing coupled to said actuator housing; and
a coupler, said coupler including an upwardly extending portion defining a first bearing surface and a downwardly extending portion defining a second bearing surface, said upwardly extending portion engaging said rotary member, and said downwardly extending portion engaging said stem, said coupler and said rotary member pivotable with said fluid flow restrictor member, wherein said coupler links said rotary member of said sensor to said stem so that said sensor directly senses via said coupler and said rotary member, the rotary position of said fluid flow restrictor member, said sensor generating position signals based on the position of the flow restrictor the position signals adapted to enable said controller to determine the position of the flow restrictor, including its open and closed positions and any position between its open and closed positions.

28. The device according to claim 27, wherein said securing member comprises a head and a threaded shaft extending from said head, wherein said downwardly extending portion comprises a slotted cup-shaped member configured to engage said head allowing for variation in perpendicularity of the head and the threaded shaft.

29. The device according to claim 27, wherein said fluid delivery device comprises a valve.

30. The device according to claim 27, wherein said fluid delivery device comprises a wye, a nozzle, or a monitor.

31. The device according to claim 27, wherein said coupler includes a cup shaped body, said upwardly extending portion comprising an upwardly extending shaft defining said first bearing surface.

32. The device according to claim 27, wherein said sensor comprises a variable potentiometer.

33. The device according to claim 27, wherein said actuator comprises an electrically powered driver coupled to said stem.

* * * * *